(12) United States Patent
Han et al.

(10) Patent No.: US 11,752,761 B2
(45) Date of Patent: Sep. 12, 2023

(54) SYSTEM FOR DROPLET MEASUREMENT

(71) Applicant: Samsung Display Co., LTD., Yongin-si (KR)

(72) Inventors: Jeong Won Han, Seongnam-si (KR); Jeong Ho Yi, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 79 days.

(21) Appl. No.: 17/560,147

(22) Filed: Dec. 22, 2021

(65) Prior Publication Data
US 2022/0348006 A1 Nov. 3, 2022

(30) Foreign Application Priority Data
Apr. 29, 2021 (KR) .................. 10-2021-0055802

(51) Int. Cl.
G01N 15/02 (2006.01)
B41J 2/045 (2006.01)
G01N 15/14 (2006.01)

(52) U.S. Cl.
CPC ........ B41J 2/0456 (2013.01); G01N 15/0227 (2013.01); G01N 2015/1493 (2013.01)

(58) Field of Classification Search
CPC ........ B41J 2/0456; B41J 2/04558; B41J 3/46; G01N 15/0227; G01N 2015/1493; G01N 2015/1075; G01N 15/1459; G01N 15/1463; G01N 15/0205
See application file for complete search history.

(56) References Cited

U.S. PATENT DOCUMENTS

| | | | |
|---|---|---|---|
| 11,009,338 B2 * | 5/2021 | Suemasu | B41M 5/0047 |
| 2018/0283856 A1 * | 10/2018 | Suemasu | B41M 3/003 |
| 2020/0395543 A1 * | 12/2020 | Han | H10K 71/00 |

FOREIGN PATENT DOCUMENTS

| | | |
|---|---|---|
| JP | 05149769 | 6/1993 |
| JP | 200623275 | 1/2006 |
| JP | 201713000 | 1/2017 |
| JP | 202039996 | 3/2020 |
| KR | 100975647 | 8/2010 |
| KR | 101643217 | 7/2016 |
| KR | 1020160083420 | 7/2016 |
| KR | 101701904 | 2/2017 |
| KR | 1020170051466 | 5/2017 |
| KR | 101818695 | 1/2018 |
| KR | 1020180102489 | 9/2018 |
| KR | 102017399 | 10/2019 |

* cited by examiner

Primary Examiner — Roy M Punnoose
(74) Attorney, Agent, or Firm — CANTOR COLBURN LLP

(57) ABSTRACT

A system for droplet measurement includes an inkjet head including a nozzle which discharges droplets, a substrate on which droplets discharged from the nozzle of the inkjet head are dripped, a first detector disposed below the substrate and including a first camera and a first focusing structure, and a second detector disposed below the substrate and including a second camera and a second focusing structure.

20 Claims, 9 Drawing Sheets

SYSTEM FOR DROPLET MEASUREMENT

This application claims priority to Korean Patent Application No. 10-2021-0055802 filed on Apr. 29, 2021, and all the benefits accruing therefrom under 35 U.S.C. § 119, the content of which in its entirety is herein incorporated by reference.

BACKGROUND

(a) Field

Embodiments of the invention relate to a system for droplet measurement and a method for droplet measurement, which are capable of substantially and simultaneously measuring a position of a nozzle of an inkjet printer and a dripping position of a droplet, a discharge speed, a discharge angle, a discharge volume, etc.

(b) Description of the Related Art

A printing system may be used in a manufacturing process of an electronic device. In manufacturing display devices such as an emissive display device or a droplet display device, a pattern or a layer may be formed using an inkjet printer.

The inkjet printer may perform printing by discharging ink droplets from a nozzle provided in an inkjet head toward an object while changing a relative position of the inkjet head and the object. In the inkjet head, individual differences may occur in a speed or a volume of the discharged droplets even in the same operating conditions due to deviations due to processing or assembling in the manufacturing process. In addition, even for a single inkjet head, the discharge speed, the discharge angle, the discharge volume, etc., may be different for each nozzle, and the dripping position of the droplet may be different for each nozzle. As the inkjet printer is used, these droplet-related parameters may change.

SUMMARY

It is desired to accurately measure a speed, an angle, and a volume of droplets discharged from an inkjet head. When the speed of the droplet is incorrect, for example, a dripping position on a target may be shifted. When the volume of the droplet is incorrect, the droplet dripped on an object may spread too much, causing blurring or conversely, cloudiness.

Embodiments are to provide a system for droplet measurement and a method for droplet measurement, which are capable of correctly, substantially, and simultaneously measuring parameters related to a droplet of an inkjet printer such as a position, a speed, an angle, a volume, etc., of a droplet discharged from a nozzle of an inkjet head.

A system for droplet measurement in an embodiment includes an inkjet head including a nozzle which discharges droplets, a substrate on which the droplets discharged from the nozzle of the inkjet head are dripped, a first detector disposed below the substrate and including a first camera and a first focusing structure, and a second detector disposed below the substrate and including a second camera and a second focusing structure.

In an embodiment, the first camera may be focused on a surface of the nozzle facing the substrate by the first focusing structure, and the second camera may be focused on a surface of the substrate facing the nozzle by the second focusing structure.

In an embodiment, the position of the nozzle may be measured by the first camera, and the position and size of the droplet dripped on the substrate may be measured by the second camera.

In an embodiment, in the system for the droplet measurement, a discharge angle of the droplet may be calculated based on the position of the nozzle and the position of the droplet, a volume of the droplet may be calculated based on the size of the droplet, and a discharge speed of the droplet may be calculated based on an application time of a signal to discharge the droplet and a time that the droplet drips on the substrate.

In an embodiment, the first camera and the first focusing structure may be arranged along a direction perpendicular to a drip direction of an ink discharged from the nozzle.

In an embodiment, the second camera and the second focusing structure may be arranged along a direction perpendicular to the drip direction.

In an embodiment, the second camera and the second focusing structure may be arranged along the drip direction.

In an embodiment, the system for the droplet measurement may further include a third detector disposed between the first detector and the second detector and including a third camera and a third focusing structure.

In an embodiment, the system for the droplet measurement may further include a beam splitter and a mirror overlapping the nozzle, and a first light providing an image of the nozzle and a second light providing an image on the substrate may be emitted to the first detector and the second detector by the beam splitter and the mirror, respectively.

In an embodiment, the first focusing structure may be disposed between the first camera and the beam splitter, and the second focusing structure may be disposed between the second camera and the mirror.

In an embodiment, the system for the droplet measurement may further include a light emitter disposed between the substrate and the beam splitter and overlapping the nozzle.

A system for droplet measurement in an embodiment includes an inkjet head including a nozzle which discharges droplets, a substrate on which the droplets discharged from the nozzle of the inkjet head are dripped, and a detector disposed below the substrate and including a camera and a focusing structure, where the focusing structure includes either a telecentric lens or a bi-telecentric lens.

In an embodiment, in the system for the droplet measurement, a position of the nozzle may be measured by the camera and a position and a size of the droplet dripped to the substrate is measured by the camera.

In an embodiment, in the system for the droplet measurement, a discharge angle of the droplet may be calculated based on the position of the nozzle and the position of the droplet, a volume of the droplet may be calculated based on the size of the droplet, and a discharge speed of the droplet may be calculated based on an application time of a signal to discharge the droplet and a time that the droplet drips on the substrate. In an embodiment, in the system for the droplet measurement, a movement path of the droplet may be measured by the camera, and a discharge trajectory of the droplet may be calculated based on the movement path.

In an embodiment, the camera and the focusing structure may be arranged along a direction perpendicular to a drip direction of an ink discharged from the nozzle.

In an embodiment, the camera and the focusing structure may be arranged along a drip direction of an ink discharged from the nozzle.

In an embodiment, the system for the droplet measurement may further include a mirror overlapping the nozzle, and a first light providing an image of the nozzle and a second light providing an image on the substrate may be reflected by the mirror and emitted to the detector.

In an embodiment, the focusing structure may be disposed between the camera and the mirror.

In an embodiment, the system for the droplet measurement may further include a light emitter disposed between the substrate and the mirror and overlapping the nozzle.

By embodiments, parameters related to droplets of an inkjet printing apparatus, such as a position, a velocity, an angle, a volume, etc., of the droplets discharged from the nozzles of the inkjet head, may be accurately measured at substantially the same time. Accordingly, by accurately and quickly acquiring the parameters related to the droplet, the discharge position, the discharge amount, the dripping position, etc., of the droplet may be adjusted in an optimal state, and the pattern or layer to be formed or provided may be accurately formed or provided using the inkjet printer. In addition, since various parameters may be measured with one measuring instrument, the equipment size and cost may be reduced.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
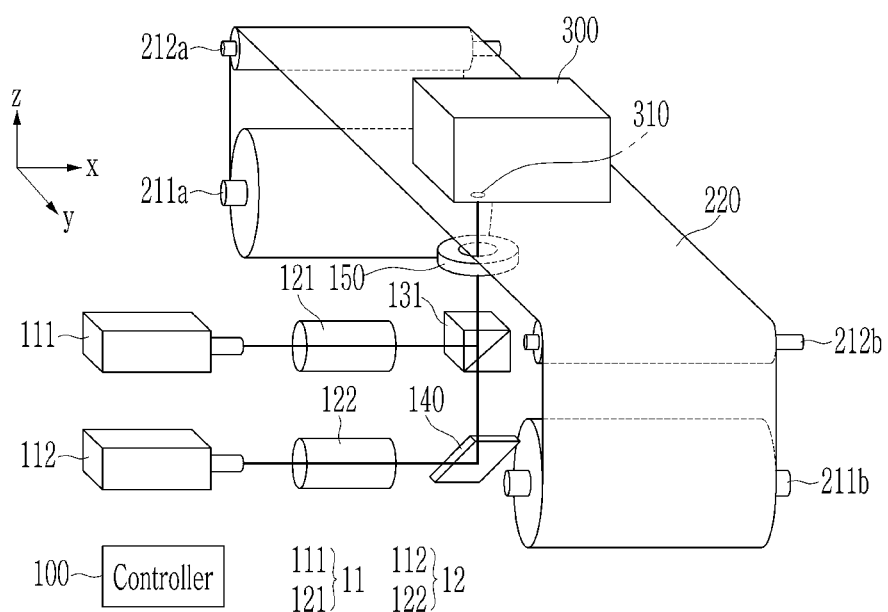
FIG. 1 is a view schematically showing an embodiment of a system for droplet measurement.

Embodiments will be described in detail with reference to accompanying drawings so that those skilled in the art to which the invention belongs can easily implement them.

Further, sizes and thicknesses of constituent members shown in the accompanying drawings are arbitrarily given for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising" will be understood to imply the inclusion of stated elements but not the exclusion of any other elements.

Throughout the specification, "connected" does not only mean that two or more constituent elements are directly connected, but when two or more constituent elements are connected indirectly through other constituent elements, and it may include a case where substantially integral parts are connected to each other even if they may be referred to by a different name depending on the position or function, as well as the case of being physically connected or electrically connected.

In the drawings, symbols "x", "y", and "z" representing directions are used, where "x" is a first direction, "y" is a second direction perpendicular to the first direction, and "z" is a third direction perpendicular to the first direction and the second direction. The first direction x, the second direction y, and the third direction z may correspond to a horizontal direction, a vertical direction, and a thickness direction of the display device, respectively.

Unless otherwise specified in the specification, "overlapping" means overlapping in a plan view and overlapping in the third direction z.

FIG. 1 is a view schematically showing an embodiment of a system for droplet measurement.

Referring to FIG. 1, a system for droplet measurement may include a measuring instrument including a first camera 111, a second camera 112, a first focusing structure 121, a second focusing structure 122, a beam splitter 131, a mirror 140, and a light emitter 150. Also, a system for droplet measurement may include rollers 211a and 211b, guide rollers 212a and 212b, and a substrate 220. The detector may be disposed at a lower level than the substrate 220 (more precisely, a plane of the substrate 220 parallel to an x-y plane) on which the droplet is dripped. The measuring instrument may be movably disposed within the system for the droplet measurement, and the system for the droplet measurement may further include a driving unit (not shown) capable of moving the measuring instrument. The measuring instrument may consist of one structure.

The system for the droplet measurement may include a controller 100 that controls the operation of a system for droplet measurement and performs the overall processing. The controller 100 may control the operation of the measuring instrument, for example, and calculate parameters related to the droplet by processing the data obtained from the measuring instrument. In an embodiment, the controller 100 may include a central processing unit ("CPU"), a memory, input and output ports, or the like. The controller 100 may also control the operation of the inkjet head 300.

In the system for the droplet measurement, the inkjet printer may discharge the droplets from the nozzle 310 of the inkjet head 300 onto the substrate 220. A plurality of nozzles 310 may be provided in the lower part of the inkjet head 300, and for example, may be disposed in a line or in a plurality of lines at a predetermined interval. In order to avoid drawing complexity, only the inkjet head 300 is schematically shown among the inkjet printer configurations.

The first camera 111 may focus on the lower surface of the nozzle 310 of the inkjet head 300 by the first focusing structure 121 and may photograph the nozzle 310. The second camera 112 may focus on the upper surface of the substrate 220 by the second focusing structure 122 and may photograph the droplets that hit the upper surface of the substrate 220. Conversely, in another embodiment, the second camera 112 is focused on the lower surface of the nozzle 310 of the inkjet head 300 by the second focusing structure 122 and may photograph the nozzle 310, and the first camera 111 may be focused on the upper surface of the substrate 220 by the first focusing structure 121 and may also photograph the droplet aligned on the upper surface of the substrate 220. To adjust the focus of the first camera 111, the first focusing structure 121 may include a plurality of lenses. To adjust the focus of the second camera 112, the second focusing structure 122 may include a plurality of lenses. The first focusing structure 121 may be disposed between the first camera 111 and the beam splitter 131, and the second focusing structure 122 may be disposed between the second camera 112 and the mirror 140. The first camera 111, the first focusing structure 121, and the beam splitter 131 may be arranged in a line, and the second camera 112, the second focusing structure 122, and the mirror 140 may be arranged in a line.

The first camera 111 and the first focusing structure 121 may configure the first detector 11, and the second camera 112, and the second focusing structure 122 may configure the second detector 12. The first detector 11 and the second detector 12 may be disposed under the inkjet head 300 and the substrate 220 so as not to overlap the nozzle 310 of the inkjet head 300. In an embodiment, the first detector 11 and the second detector 12 may be disposed in a direction approximately perpendicular to the drip direction of the ink discharged from the nozzle 310 of the inkjet head 300, and the first camera 111 and the second camera 112 may take a predetermined image (e.g., the lower surface of the nozzle 310, the droplet dripped on the substrate 220) in a direction approximately perpendicular to the drip direction of the ink, for example.

The beam splitter 131 and the mirror 140 may overlap the nozzle 310 of the inkjet head 300. The beam splitter 131 and the mirror 140 may be arranged in the same axis as the axis of the nozzle 310. In an embodiment, the nozzle 310, the beam splitter 131, and the mirror 140 may be arranged in a line in the third direction z, for example. The first light providing the image of the nozzle 310 and the second light providing the image on the substrate 220 are divided by the beam splitter 131, so that the first light may be emitted to the first detector 11 and the second light may be reflected by the mirror 140 to be emitted to the second detector 12. As above-described, by the beam splitter 131 and the mirror 140, the first camera 111 and the second camera 112 may simultaneously or substantially simultaneously shoot the image disposed at their own focal distances. As the beam splitter 131 and the mirror 140 overlap the inkjet head 300, the nozzle 310 and the droplet may be photographed simultaneously in real time.

The rollers 211a and 211b may supply and recover the substrate 220 to which the droplet is dripped. The rollers 211a and 211b may be disposed one by one on opposite sides of the inkjet head 300 in the plan view. One of the rollers 211A and 211b may be a roller that supplies the substrate 220 to which the droplet will be dripped, and the other may be a roller that recovers the substrate 220 where the droplet has been dripped. The rollers 211a and 211b may be operated under the control of the controller 100.

The substrate 220 may be optically transparent. The substrate 220 may be a water-repellent coated substrate. The substrate 220 may be a polymer substrate or a glass substrate. The substrate 220 may provide a dripping surface substantially parallel to the x-y plane. The dripping surface of the substrate 220 may be disposed between the inkjet head 300 and the measuring instrument.

The guide rollers 212a and 212b may be provided between the rollers 211a and 211b and the inkjet head 300.

The guide rollers 212a and 212b may define the position (e.g., a height) of the substrate 220 at which the droplet will be dripped. In an embodiment, the level of the upper surface of the guide rollers 212a and 212b may be substantially the same as the level of the substrate 220, for example. The guide rollers 212a and 212b may apply a tension to the substrate 220. In another embodiment, the guide rollers 212a and 212b may be omitted, and in this case, the rollers 211a and 211b may serve as the guide rollers 212a and 212b.

The light emitter 150 may provide illumination to the inkjet head 300 to obtain a clear image. The light emitter 150 may be in the form of a ring, and the opening of the ring may overlap the nozzle 310 and the droplet to be photographed. The light emitter 150 may be disposed between the substrate 220 and the beam splitter 131. The light emitter 150, the beam splitter 131, and the mirror 140 may be arranged in a line in the third direction z. The light emitter 150 may be controlled by the controller 100.

In the system for the droplet measurement in an embodiment, a method for measuring and calculating the position of the nozzle of the inkjet head and the dripping position of the droplet, the discharge speed, the discharge angle, the discharge volume, etc., is described with reference to FIG. 1 to FIG. 4.

Figure 2:
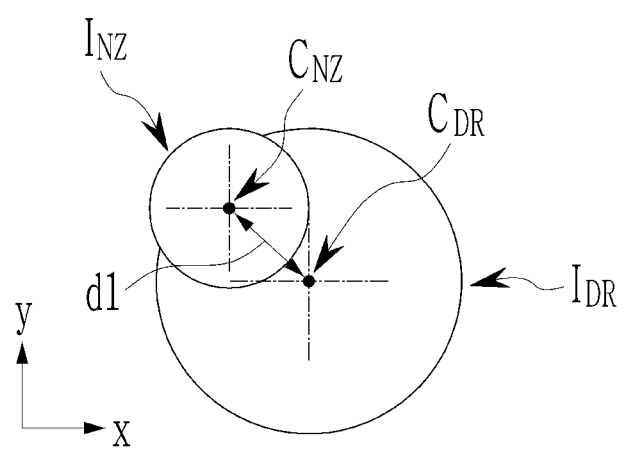
FIG. 2 is a view showing an embodiment of a nozzle and a droplet measured from a system for a droplet measurement.
Figure 3:
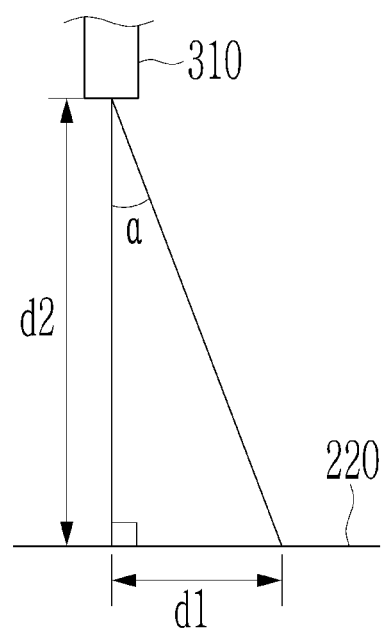
FIG. 3 is a view to explain an embodiment of a method for obtaining a discharge angle of a droplet from a system for droplet measurement.
Figure 4:
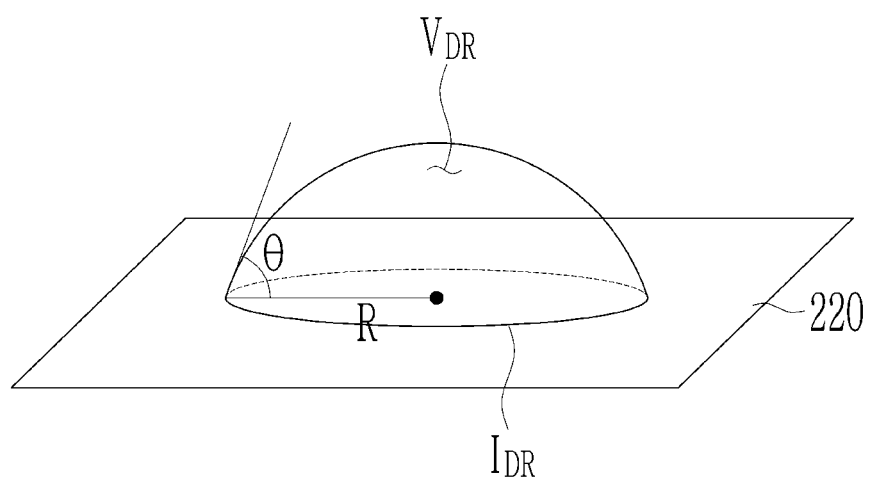
FIG. 4 is a view to explain an embodiment of a method for obtaining a volume of a droplet from a system for droplet measurement.

FIG. 2 is a view showing an embodiment of a nozzle and a droplet measured from a system for droplet measurement, FIG. 3 is a view to explain an embodiment of a method for obtaining a discharge angle of a droplet from a system for droplet measurement, and FIG. 4 is a view to explain an embodiment of a method for obtaining a volume of a droplet from a system for droplet measurement.

Referring to FIG. 1, by adjusting the first focusing structure 121, the focus of the first camera 111 may be adjusted to be focused to the lower surface of the nozzle 310 which may correspond to the lower surface of the inkjet head 300. In addition, by adjusting the second focusing structure 122, the focus of the second camera 112 may be adjusted to be focused on the upper surface of the substrate 220 where the droplets are to be dripped. In this way, after focusing the first camera 111 and the second camera 112, the lower surface of the nozzle 310 may be photographed with the first camera 111, and the droplet that is dripped on the substrate 220 may be photographed with the second camera 112.

Referring to FIG. 2, the position of the nozzle 310 may be measured from the nozzle image $I_{NZ}$ obtained by the first camera 111. In addition, the dripping position and the size of the droplet may be measured from the droplet image $I_{DR}$ obtained by the second camera 112. Here, the size of the droplet may mean the area of the droplet in the plan view. The distance d1 between the center $C_{NZ}$ of the nozzle and the center $C_{DR}$ of the droplet may be measured from the nozzle image $I_{NZ}$ and the droplet image $I_{DR}$.

Referring to FIG. 3, a discharge angle $\alpha$ of the droplet may be obtained from the difference of the position of the nozzle 310 measured by the first camera 111 and the position of the droplet measured by the second camera 112. That is, the discharge angle $\alpha$ of the droplet may be obtained from the distance d1 between the center $C_{NZ}$ of the nozzle and the center $C_{DR}$ of the droplet, and the distance d2 between the nozzle 310 and the substrate 220. In the shown right triangle, since $$\tan\alpha = \frac{d1}{d2},$$

the discharge angle α is $$\arctan\left(\frac{d1}{d2}\right).$$

The distance d2 between the nozzle 310 and the substrate 220 may be set in the system for the droplet measurement. In an embodiment, in the apparatus during the ink droplet discharge, it may be determined by adjusting the distance between the nozzle 310 and the substrate 220, for example. The discharge angle α may represent an angle at which the flight direction of the droplet discharged from the nozzle 310 is deviated from the axis of the nozzle 310. When the discharge angle α is 0, it may mean that the flight direction of the droplet coincides with the axis of the nozzle 310.

The discharge speed of the droplet may be obtained from the time information when the droplet is discharged from the nozzle 310 and the time information when the droplet drips on the substrate 220. The time information when the droplet is discharged may be the time when the nozzle 310 applies a signal to the inkjet printer to discharge the droplet. Since the second camera 112 may capture the image on the substrate 220 in real time, the time information when the droplet drips on the substrate 220 may be measured by the second camera 112. The travel distance (e.g., the flight length) of the droplet approximately corresponds to the length of the hypotenuse in the right triangle shown in FIG. 3. Therefore, when the time when the discharge signal of the droplet is applied is t1 and the time when the droplet is dripped is t2, the discharge speed of the droplet may be calculated as $$\frac{d2}{\cos\alpha(t2-t1)}.$$

Referring to FIG. 4, the discharge volume $V_{DR}$ of the droplet may be obtained from the droplet image $I_{DR}$ obtained by the second camera 112. The radius R of the droplet may be measured from the droplet image $I_{DR}$. The contact angle θ defined by the surface energy between the droplet and the substrate may be measured in advance and stored in the system for the droplet measurement (e.g., the memory of the controller 100). From the radius R and the contact angle θ of the droplet, the discharge volume $V_{DR}$ of the droplet may be obtained arithmetically according to the following equation.

$$V_{DR} = \frac{\pi R^3(\cos^3\theta - 3\cos\theta + 2)}{3\sin^3\theta}$$

(where π is a ratio of a circumference of a circle to its diameter).

Figure 5:
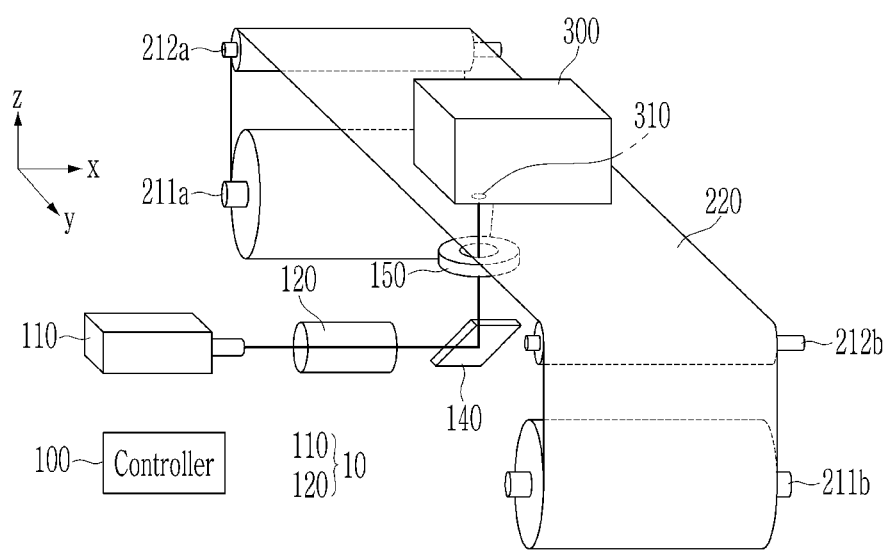
FIG. 5 is a view schematically showing an embodiment of a system for droplet measurement.
Figure 6:
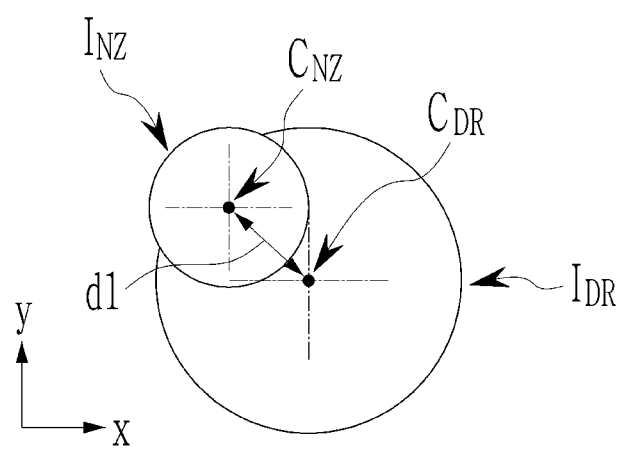
FIG. 6 is a view showing an embodiment of a nozzle and a droplet measured from a system for droplet measurement.

FIG. 5 is a view schematically showing an embodiment of a system for droplet measurement, and FIG. 6 is a view showing an embodiment of a nozzle and a droplet measured from a system for droplet measurement.

A system for droplet measurement shown in FIG. 5 has a difference from the system for the droplet measurement shown in FIG. 1 aforementioned in the composition of the measuring instrument. Specifically, the measuring instrument may include a camera 110, a focusing structure 120, a mirror 140, and a light emitter 150. Unlike the above-described embodiment, the measuring instrument may include one detector 10, that is, one camera 110 and one focusing structure 120. Since it includes one detector 10, the measuring instrument may not include the beam splitter 131. The camera 110 and the focusing structure 120 may be arranged along a direction perpendicular to the drip direction of the ink discharged from the nozzle 310 of the inkjet head 300, and the camera 110 may photograph a predetermined image in a direction perpendicular to the drip direction of the ink. The mirror 140 may overlap the nozzle 310 of the inkjet head 300, and the focusing structure 120 may be disposed between the mirror 140 and the camera 110. The first light providing the image of the nozzle 310 and the second light providing the image on the substrate 220 may be reflected by the mirror 140 and emitted to the detector 10. The light emitter 150 may be disposed between the nozzle 310 and the mirror 140.

The camera 110 may simultaneously photograph the lower surface of the nozzle 310 and the upper surface of the substrate 220. To this end, the focusing structure 120 may include a telecentric lens or a bi-telecentric lens. When the telecentric lens or the bi-telecentric lens is used, the image size does not change depending on the distance, so the lower surface of the nozzle 310 and the droplet on the upper surface of the substrate 220 may be photographed clearly with the correct size (dimensions) by a single camera 110.

Referring to FIG. 6, the position and size of the nozzle 310 may be measured from the nozzle image $I_{NZ}$ obtained by the camera 110. In addition, it is possible to measure the dripping position and size of the droplet from the droplet image $I_{DR}$ obtained by the camera 110. From the nozzle image $I_{NZ}$ and droplet image $I_{DR}$, the distance d1 between the center $C_{NZ}$ of the nozzle and the center of the droplet $C_{DR}$ may be measured. In addition, the discharge angle, the discharge speed, the discharge volume, etc., of the droplet may be obtained by the same method as the method described above.

Even when the system for the droplet measurement includes one camera 110, as the focusing structure 120 including the telecentric lens or the bi-telecentric lens is used, the droplet may be taken from the time when the droplet is discharged from the nozzle 310 to the time when the droplet drips on the substrate 220. From a plurality of or consecutive droplet images taken, the position of the droplet depending on the time, that is, the movement path may be measured, and thus the discharge trajectory of the droplet may be obtained.

Figure 7:
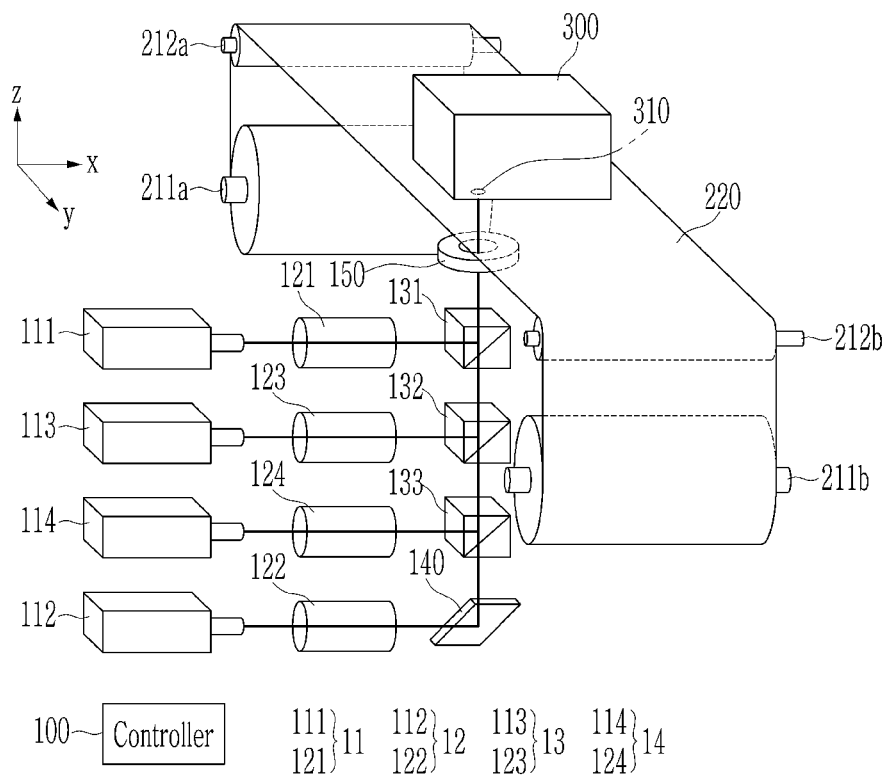
FIG. 7 is a view schematically showing an embodiment of a system for droplet measurement.

FIG. 7 is a view schematically showing an embodiment of a system for droplet measurement.

A system for droplet measurement shown in FIG. 7 has a difference from the system for the droplet measurement shown in FIG. 1 aforementioned in the composition of the measuring instrument.

Referring to FIG. 7, the measuring instrument may include additional detectors 13 and 14 between the first detector 11 and the second detector 12. The third detector 13 may include a third camera 113 and a third focusing structure 123, and the fourth detector 14 may include a fourth camera 114 and a fourth focusing structure 124. It may further include beam splitters 132 and 133 of as many as the number of additional detectors 13 and 14. The beam splitters 131, 132, and 133 and the mirror 140 may overlap the nozzle 310 of the inkjet head 300. The beam splitters 131, 132, and 133 and mirror 140 may be arranged in a line in the third direction z.

The third detector 13 may be disposed between the first detector 11 and the fourth detector 14, and the fourth detector 14 may be disposed between the third detector 13 and the second detector 12.

The first camera 111 may be focused on the lower surface of the nozzle 310 of the inkjet head 300 by the first focusing structure 121, and may photograph the nozzle. The second camera 112 may be focused on the upper surface of the substrate 220 by the second focusing structure 122, and may photograph the droplet that drips on the upper surface of the substrate 220. The third camera 113 may be focused on a point between the lower surface of the nozzle 310 and the upper surface of the substrate 220 by the third focusing structure 123, and may photograph the dripping droplets. The fourth camera 114 may be focused on a point between the lower surface of the nozzle 310 and the upper surface of the substrate 220 (e.g., a point different from the focus of the third camera 113) by the fourth focusing structure 124, and may capture the dripping droplets.

In this way, since the movement path of the droplet may be measured by photographing the droplet dripping by the third detector 13 and the fourth detector 14, the discharge trajectory of the droplet may be obtained. It is illustrated that the measuring instrument includes two detectors 13 and 14 between the first detector 11 and the second detector 12, but by including at least one additional detector, the discharge trajectory of the droplet may be obtained, and as the number of the additional detectors increases, the precision of the discharge trajectory may be improved.

Figure 8:
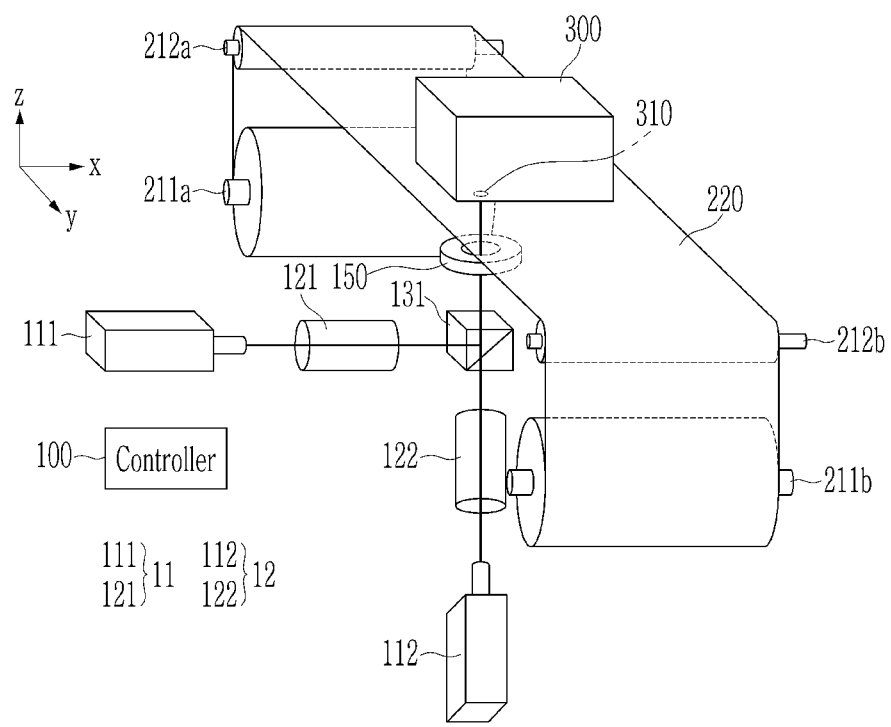
FIG. 8 is a view schematically showing an embodiment of a system for droplet measurement.

FIG. 8 is a view schematically showing an embodiment of a system for droplet measurement.

A system for droplet measurement shown in FIG. 8 has a difference compared with the system for the droplet measurement shown in FIG. 1 aforementioned in the arrangement of the second detector 12 of the measuring instrument.

Referring to FIG. 8, the second detector 12 including the second camera 112 and the second focusing structure 122 may overlap the nozzle 310 of the inkjet head 300. The second camera 112 and the second focusing structure 122 may be arranged along the drip direction of the droplet. Accordingly, the nozzle 310, the light emitter 150, the beam splitter 131, the second focusing structure 122, and the second camera 112 may be arranged in a line or coaxially in the third direction z. Since the second detector 12 overlaps the nozzle 310, no light path conversion is desired for the second detector 12, and the measuring instrument may not include the mirror 140 shown in FIG. 1.

Figure 9:
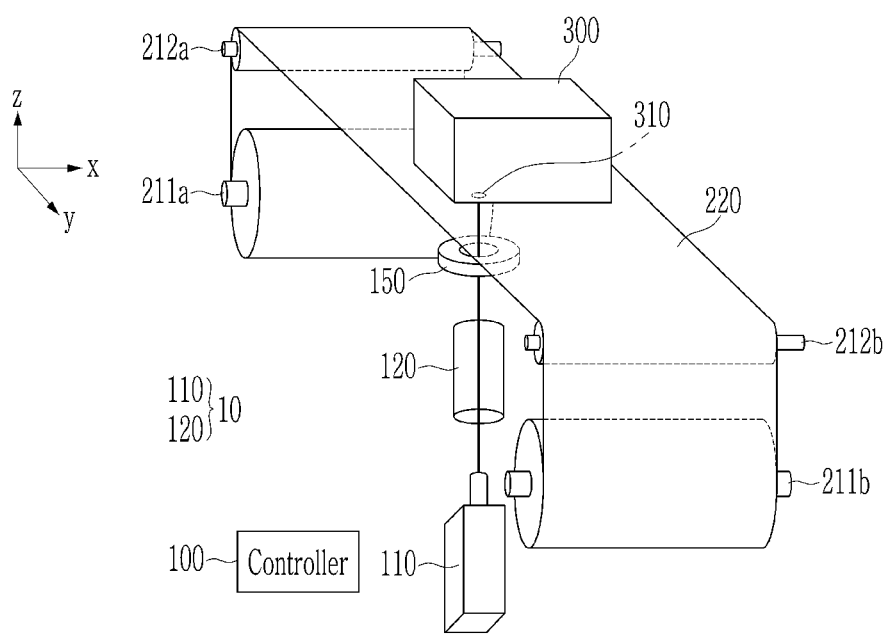
FIG. 9 is a view schematically showing an embodiment of a system for droplet measurement.

FIG. 9 is a view schematically showing an embodiment of a system for droplet measurement.

A system for droplet measurement shown in FIG. 9 has a difference compared with the system for the droplet measurement shown in FIG. 5 aforementioned in the arrangement of the measuring instrument.

Referring to FIG. 9, the detector 10 including the camera 110 and the focusing structure 120 may overlap the nozzle 310 of the inkjet head 300. Accordingly, the nozzle 310, the light emitter 150, the focusing structure 120, and the camera 110 may be arranged in a line or coaxially in the third direction z. Since the detector 10 overlaps the nozzle 310, no light path conversion is desired for the detector 10, and the measuring instrument may not include the mirror 140 shown in FIG. 5.

While the invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A system for droplet measurement comprising:
   an inkjet head including a nozzle which discharges droplets;
   a substrate on which the droplets discharged from the nozzle of the inkjet head are dripped;
   a first detector disposed below the substrate and including a first camera and a first focusing structure; and
   a second detector disposed below the substrate and including a second camera and a second focusing structure.

2. The system for the droplet measurement of claim 1, wherein:
   the first camera is focused on a surface of the nozzle facing the substrate by the first focusing structure, and the second camera is focused on a surface of the substrate facing the nozzle by the second focusing structure.

3. The system for the droplet measurement of claim 2, wherein:
   a position of the nozzle is measured by the first camera, and a position and a size of the droplet dripped on the substrate are measured by the second camera.

4. The system for the droplet measurement of claim 3, wherein:
   a discharge angle of the droplet is calculated based on the position of the nozzle and the position of the droplet,
   a volume of the droplet is calculated based on the size of the droplet, and
   a discharge speed of the droplet is calculated based on an application time of a signal to discharge the droplet and a time which the droplet drips on the substrate.

5. The system for the droplet measurement of claim 1, wherein:
   the first camera and the first focusing structure are arranged along a direction perpendicular to a drip direction of an ink discharged from the nozzle.

6. The system for the droplet measurement of claim 5, wherein:
   the second camera and the second focusing structure are arranged along a direction perpendicular to the drip direction.

7. The system for the droplet measurement of claim 5, wherein:
   the second camera and the second focusing structure are arranged along the drip direction.

8. The system for the droplet measurement of claim 1, further comprising:
   a third detector disposed between the first detector and the second detector and including a third camera and a third focusing structure.

9. The system for the droplet measurement of claim 1, further comprising:
   a beam splitter and a mirror overlapping the nozzle, and
   a first light providing an image of the nozzle and a second light providing an image on the substrate are emitted to the first detector and the second detector by the beam splitter and the mirror, respectively.

10. The system for the droplet measurement of claim 9, wherein:
    the first focusing structure is disposed between the first camera and the beam splitter, and the second focusing structure is disposed between the second camera and the mirror.

11. The system for the droplet measurement of claim 9, further comprising:
a light emitter disposed between the substrate and the beam splitter and overlapping the nozzle.

12. A system for droplet measurement comprising:
an inkjet head including a nozzle which discharges droplets;
a substrate on which the droplets discharged from the nozzle of the inkjet head are dripped; and
a detector disposed below the substrate and including a camera and a focusing structure,
wherein the focusing structure includes either a telecentric lens or a bi-telecentric lens.

13. The system for the droplet measurement of claim 12, wherein:
a position of the nozzle is measured by the camera and a position and a size of the droplet dripped to the substrate is measured by the camera.

14. The system for the droplet measurement of claim 13, wherein:
a discharge angle of the droplet is calculated based on the position of the nozzle and the position of the droplet,
a volume of the droplet is calculated based on the size of the droplet, and
a discharge speed of the droplet is calculated based on an application time of a signal to discharge the droplet and a time which the droplet drips on the substrate.

15. The system for the droplet measurement of claim 12, wherein:
a movement path of the droplet is measured by the camera, and
a discharge trajectory of the droplet is calculated based on the movement path.

16. The system for the droplet measurement of claim 12, wherein:
the camera and the focusing structure are arranged along a direction perpendicular to a drip direction of an ink discharged from the nozzle.

17. The system for the droplet measurement of claim 12, wherein:
the camera and the focusing structure are arranged along a drip direction of an ink discharged from the nozzle.

18. The system for the droplet measurement of claim 12, further comprising:
a mirror overlapping the nozzle, and
a first light providing an image of the nozzle and a second light providing an image on the substrate are reflected by the mirror and emitted to the detector.

19. The system for the droplet measurement of claim 18, wherein:
the focusing structure is disposed between the camera and the mirror.

20. The system for the droplet measurement of claim 18, further comprising:
a light emitter disposed between the substrate and the mirror and overlapping the nozzle.

* * * * *